FIGURE 3

TABLE 1

| RUN | % H₂O | TEMPERATURE (°F) | | | | | DIE | | Q lb/hr | N rpm | HP |
|---|---|---|---|---|---|---|---|---|---|---|---|
| | | 1 | 2 | 3 | Die | Stock | Type | Pressure | | | |
| ES-1 | 40 | 190 | 285 | 250 | 270 | 338 ±9 | 1/4" id pipe | 150 | 2.56 | 20 | .103 |
| ES-2 | 40 | 190 | 295 | 265 | 320 | 350 | " | fluct. 150-1000 | 2.9 | 20 | - |
| ES-3 | 35 | 190 | 300 | 300 | 285 | 340 | 1/8" rod | fluct. 150-350 | .9 | 20 | .055 |
| ES-4 | 30 | 190 | 285 | 265 | 285 | 340 | " | 1400 | unstable | 20 | .095 |
| ES-5 | 30 | 320 | 320 | 320 | 285 | 335 | 1/4" rod | 400 | | 20 | .048 |
| ES-6 | 30 | 300 | 300 | 300 | 285 | 330 | " | fluct. 1100-400 | 1.98 | 20 | .0826 |
| ES-7 | 30 | 190 | 300 | 300 | 220 | 230 | " | 1000 | 2.7 | 15 | .020 |
| ES-8 | 30 | 190 | 300 | 300 | 210 | 230 | " | 200-1000 | 2.1 | 15 | .031 |
| ES-9 | 30 | 190 | 300 | 300 | 200 | - | 1/4" pipe | 2000 | 0.70 | 15 | .041 |
| ES-10 | 30 | 150 | 270 | 270 | 230 | - | sheet | 1500 | - | 10 | .062 |
| ES-11 | 30 | 180 | 270 | 270 | 210 | 250 | 1/4" rod | 500-3500 | - | 15 | .041 |
| ES-12 | 30 | 190 | 300 | 300 | 280 | 250 | 1/8" rod | 3500 | - | 10 | 0.038 |

FIG.3

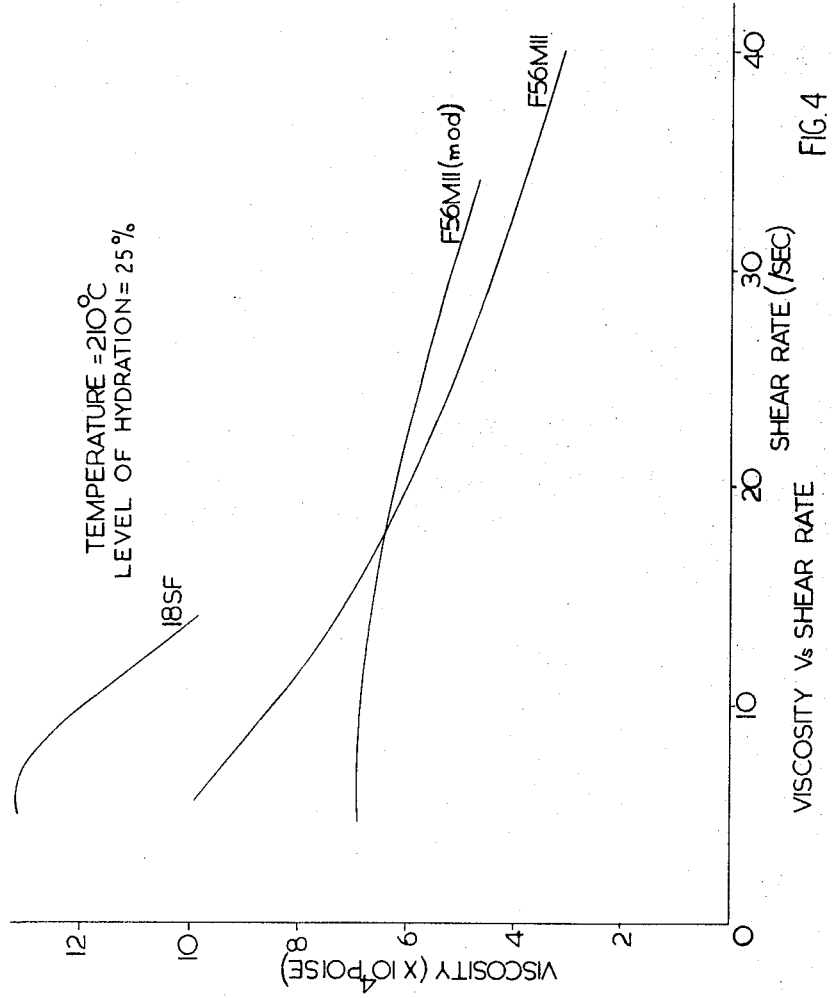

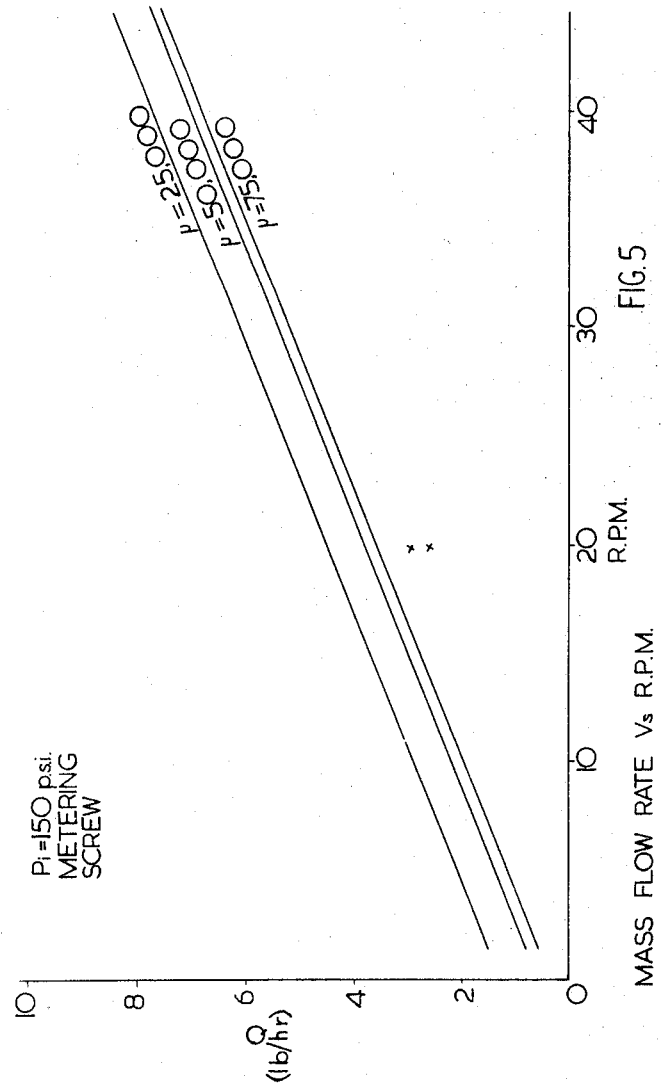

United States Patent Office 3,839,517
Patented Oct. 1, 1974

3,839,517
PRODUCING ALKALI METAL SILICATE
FOAMED PRODUCTS
Francis W. Maine, 135 Renfield St.,
Guelph, Ontario, Canada
Continuation-in-part of abandoned application Ser. No. 26,355, Apr. 7, 1970. This application Oct. 30, 1972, Ser. No. 301,807
Int. Cl. B29d 27/00; B29f 3/06; C04b 35/16
U.S. Cl. 264—42
12 Claims

ABSTRACT OF THE DISCLOSURE

An apparatus and process are described for producing a foamed product from a hydrated alkali metal silicate. The alkali metal silicate starting material is hydrated preferably in an extruder apparatus, and is physically converted to a fluid-like viscoelastic mass containing water of hydration under pressure. Physical conversion to a viscoelastic condition takes place preferably in a thermo-viscoelastic condition takes place preferably in a thermo-plastics extrusion device in which the alkali metal silicate is subjected to temperatures in the range from about 100° C. to about 400° C., and a pressure of less than about 10,000 p.s.i. The hydrated alkali metal silicate is preferably insolubilized by chemically reacting at least one selected insolubilizing additive therewith to render the silicate sparingly water soluble. The insolubilizing additive can be one or more commonly known agents forming insoluble silicates, i.e., typically compounds of alumina, earth alkali metals and magnesium metal powder. Hydration and insolubilization of the alkali metal silicate is more preferably carried out in a screw-type extruder device which subjects the mixture of alkali metal silicate and insolubilizers to a temperature in the range from about 100° C. to about 400° C. and a pressure in the range from about 20 p.s.i. to about 10,000 p.s.i. in the presence of water thereby mixing, chemically reacting, and hydrating said insolubilizing material and alkali metal silicate. The silicate hydrate in a fluid-like viscoelastic condition is extruded and depressurized rapidly such that the water of hydration, previously under pressure, is caused to expand and cause foaming of the extrudate. The extrudate is preferably confined during foaming to cause shaped foaming.

This application is a continuation-in-part of U.S. Ser. No. 26,355 filed on Apr. 7, 1970 now abandoned.

This invention pertains broadly to a process and apparatus for producing a foamed product from an alkali metal silicate composition, for instance, for use in the construction, and appliance industries. More particularly, the invention relates to an apparatus and process for processing a hydrated alkali metal silicate starting material in an extrusion device normally used in the processing of organic thermoplastic materials.

BACKGROUND OF THE INVENTION

It is known per se that a sodium silicate solution can be caused to foam following the application of heat. The resulting foam, however, is water soluble and its use in the past has been somewhat limited for that and other reasons, especially in the building industry. On the other hand, there has been a long-felt want for a fire-resistant or fire-retardant insulating material that could be produced both efficiently and cheaply. Materials currently available on the market are combustible and frequently too expensive to promote their widespread acceptance and use. Rigid urethane foams for example, have been somewhat limited in commercial applications due largely to factors of cost and combustibility.

SUMMARY OF THE INVENTION

Recent work which we have carried out has revealed, contrary to past beliefs, that sodium silicate foams can indeed be stabilized and rendered sparingly water soluble. Such findings do not themselves form part of the present subject matter, and the reader is referred, for instance, to this applicant's U.S. Pat. 3,663,249 of May 16, 1972, issued to R. P. Rao and entitled Method for Insolubilizing Sodium Silicate Foam. Subsequent to that work establishing that sodium silicate foams can be rendered sparingly soluble, we have found unexpectedly that an alkali metal silicate hydrate can be physically converted to a fluid-like viscoelastic condition. We have also found that the alkali metal silicate starting material can be converted to a viscoelastic condition irrespective of whether it has been modified to render it sparingly water soluble or not. We have also found that this previously unrecognized viscoelasticity enables a hydrated alkali metal silicate starting material to be treated and processed in devices already available in the market place and often used with organic thermoplastics. This is an unexpected result, in view of the fact that silicate materials are commonly considered as being rigid and too abrasive to be processed in such devices.

Earlier studies had shown that alkali metal silicate hydrates are capable of foaming upon rapid input of thermal energy, e.g., conventional heat or preferably microwave energy, with the water of hydration acting as the blowing agent. See U.S. Pat. 3,743,601 of July 3, 1973 issued to R. P. Rao. In practice, the process there described requires a 2-step, batch process; namely, (a) hydrating of particulate alkali metal silicate under elevated pressure and temperature conditions followed by cooling and (b) rapid heating of the silicate hydrates so prepared.

In utilizing the viscoelastic nature of the hydrates of the silicate starting material the present invention contemplates a continuous process in which hydration of the alkali metal silicates and/or mixtures with insolubilizing agents, is carried out in a commercial extrusion device. Such an extrusion device maintains the viscoelastic mass being processed therein under pressure and at an elevated temperature until the mass is hydrated, plasticized, reacted and completely homogenized. The extrusion device enables physical conversion of the starting materials into the finished foamed silicate product in a continuous operation, as compared to the two step batch process mentioned above.

Due to this viscoelasticity, the hydrated alkali metal silicates exhibit fluid-like properties similar to those of conventional heat-softened thermoplastics. The fluidity is obtained, however, without the high temperatures normally associated with silicate glasses in a molten, heat softened form in which they are capable of flow.

In order to contribute to an understanding of the present invention, the following physical properties have been found to be desirable in making the production of silicate foams commercially attractive: (1) a high degree of insolubility in water; (2) incombustibility; (3) thermal conductivity of about 0.25 to 0.3 B.t.u./hr./ft. sq./° F./in. thickness at 70° F. in order to provide desired insulating properties; (4) density from about 5 to about 10 lbs. per cubic foot; (5) good physical and chemical stability under a wide range of temperatures and environments in which the foamed product is intended to be used; and (6) adequate machinability.

It is therefore an object herein to produce foamed products from an alkali metal silicate starting material in a manner which had not previously been thought to be possible. An alkali metal silicate starting material is hydrated, and preferably stabilized using an inorganic or organo metallic additive to render the alkali metal silicate sparingly water soluble.

It is also an object of a preferred embodiment of the present invention to produce foamed products from a hydrated alkali metal silicate starting material by passing such a silicate composition through an extruder in which the alkali metal silicate is continuously, physically converted to a form possessing fluid-like viscoelastic properties that have not previously been recognized. The viscoelastic properties are obtained by subjecting the silicate starting material to a range of temperatures and pressures at which an extruder is normally operated, and such that upon extrusion, water of hydration which had been under pressure, is converted to stream, causing foaming of the extrudate. Such temperatures are preferably from 120° C. to about 250° C. with a corresponding preferred pressure of less than about 5000 p.s.i., a pressure sufficient to inhibit vapour formation within the extruder at a given operating temperature.

These and other objects and features of this invention will become apparent from the detailed description below. In a broad sense, however, the present invention contemplates a process for producing a foamed product from a foamable hydratable alkali metal silicate starting material; wherein the improvement comprises physically converting, preferably continuously, the alkali metal silicate starting material to a fluid-like viscoelastic condition containing water of hydration under pressure by bringing the alkali metal silicate starting material and water to a temperature in the range from about 100° C. to about 400° C. and a pressure of less than about 10,000 p.s.i., sufficient to inhibit vapour formation; and maintaining these conditions until the silicate mass is hydrated, plasticized, reacted and completely homogenized, and finally extruded, whereby the water previously held under pressure is converted to steam and causes foaming. The alkali metal silicate starting material is preferably hydrated and more preferably stabilized by reacting with insolubilizing additives, in a screw-type extruder device which is operated at a temperature from about 100° C. to about 400° C. and at a pressure in the range from about 20 p.s.i. to 10,000 p.s.i. Physical conversion of the alkali metal silicate and subsequent shaped foaming thereon can also be achieved using an injection molding device.

The starting material is preferably a silicate of sodium, potassium, rubidium, or caesium, having a high silica to alkali oxide ratio of up to about 7:1. More preferably, this ratio is in the range from about 1:1 to 5:1. It is also preferable that the alkali metal silicate be in particulate form; however, the starting material can also be in other forms such as a gel hydrate made from liquid sodium silicate.

DESCRIPTION OF THE DRAWINGS

For a better understanding of this invention, reference should now be had to the accompanying drawings which illustrate by way of example only some embodiments of the same, and in which:

FIG. 3 is a table showing the results of experimental trial runs using a screw-type extruder device;

FIGS. 4 and 4A are graphical representations of viscosity of illustrative starting materials plotted against shear rate at a selected temperature of about 210° C.;

FIG. 5 is a graphical representation showing theoretical output rate from a screw-type extruder device as a function of rotation of the screw, for material having different viscosities.

DESCRIPTION OF THE PREFERRED EMBODIMENTS

Figure 1:
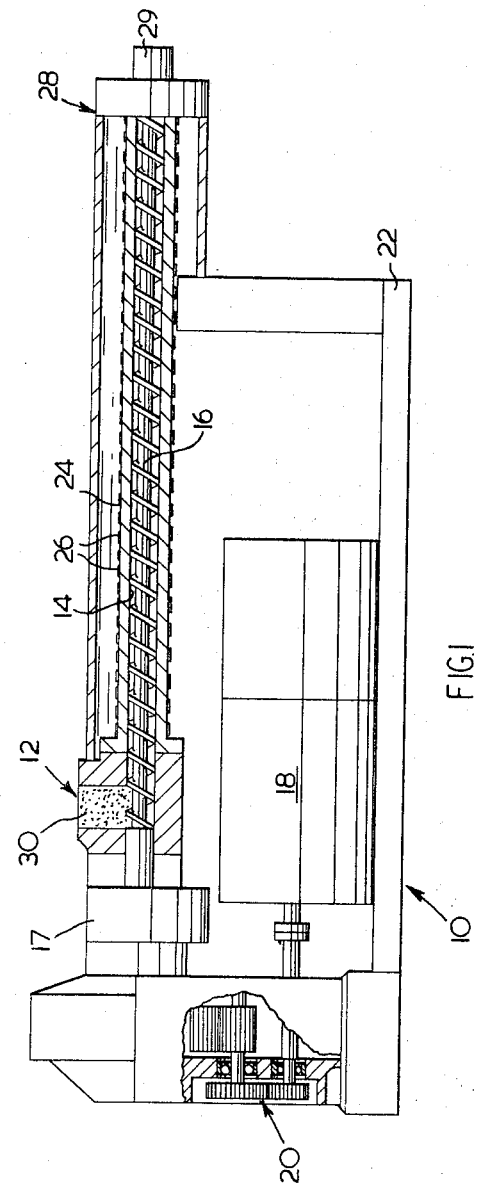
FIG. 1 is an elevation view taken in cross-section longitudinally to show somewhat schematically a conventional screw-type extruder device.
Figure 2:
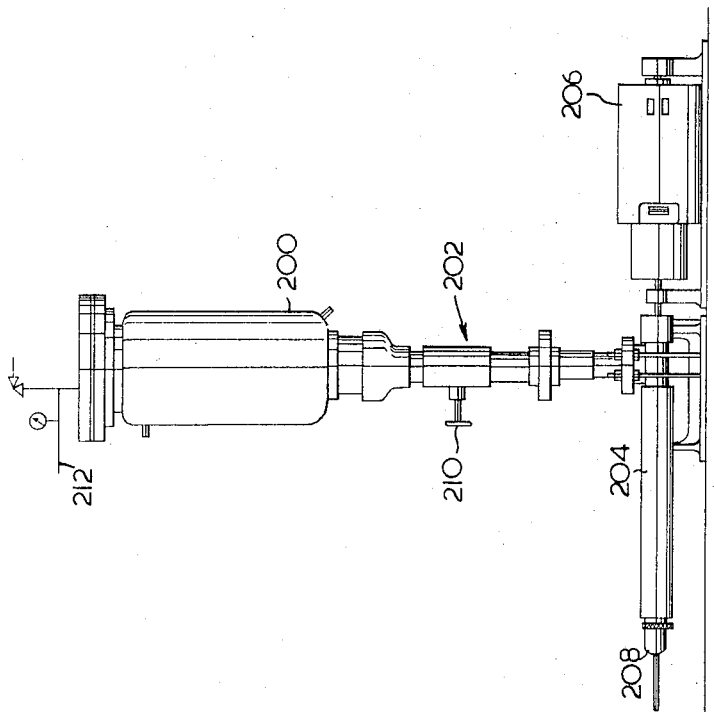
FIG. 2 shows one embodiment for carrying out the process contemplated herein.

Turning to the drawings, FIG. 1 illustrates schematically a conventional extruder device that is shown overall at 10. Starting material is fed into the extruder device 10 through an inlet feed opening shown at 12. This inlet feed opening communicates with the interior of an extruder barrel 14 which extends longitudinally of the extruder device 10. An auger or screw 16 is supported from a head portion 17 of the extruder device 10, and is disposed to extend centrally and coaxially of the extruder barrel 14. The screw 16 is in driven engagement with a driving motor 18 through a gear reduction unit 20. The driving motor 18 and gear reduction unit 20 are mounted on a base 22 of the extruder device 10. Rotation of the screw 16 propels material along the extruder barrel 14, subjecting that material to pressure. The extruder device 10 is designed to operate at high and continuous pressures, of up to 10,000 p.s.i. The extruder barrel 14 is therefore provided with a heavy interior wall 24. Extruder screw 16 may subject material being processed to pressure in a number of stages, or screw 16 may cause primarily feeding with additional pressure derived elsewhere. (FIG. 2). The extruder device 10 is shown having a number of high temperature electrical heating coils 26, provided to surround the extruder barrel 14 concentrically in order to supply heat to the material to be extruded. In the embodiment of FIG. 1, pressure generated by the rotatable screw 16 coacts with heat derived from coils 26 to physically convert the alkali metal silicate starting material to be extruded, into a fluid-like condition which contains water of hydration under pressure.

It will be apparent from a review of a phase diagram showing the state of water at different pressures and temperatures that under certain conditions water under pressure can be in either gaseous or liquid form or that both can coexist. Since the extruder device 10 can be operated at whatever pressure and temperature conditions are selected within the design and operating capabilities of the extruder, it will be evident that suitable combinations of pressures and temperatures can be chosen to maintain the water in the (alkali metal) silicate composition in the preferred liquid state within the extruder.

In this conjunction, it has been found that selected alkali metal silicate starting materials in the presence of from about 5% up to 40% by weight of water form hydrated alkali metal silicates progressively more readily at elevated temperatures and pressures, and that such hydrated silicates while solid glassy masses at room temperature exhibit visco-elasticity, i.e., become pliable and flowable at elevated temperatures.

Returning to FIG. 1, the heating coils 26 could be replaced by other equivalent forms of heating such as gas, steam, "Dowtherm" (trade mark), or the like.

The extruder device 10 has a forward or nose portion 28 to which a die 29 can be secured. The die 29 has an extrusion orifice or opening of a preselected cross-sectional area and shape. See column 8 of FIG. 3. The extrusion orifice or die opening is adapted to provide solid, tubular, circular, or multi-sided cross-sectional shapes in the material being extruded through that orifice. This cross-sectional shape provides a degree of preforming to the extrudate which is then preferably confined within walls of a generally corresponding shape to enable foaming and expansion to take place to provide a foamed extrudate having the final desired form.

The extruder device 10 is intended to be operated in a manner that is basically similar to the well known techniques of operating extruders in the field of organic thermoplastics. Accordingly, it is not necessary for a complete understanding of the present invention, to provide a detailed description of all aspects of the structure and the control of operation of the extruder device 10. These are well known, per se. For present purposes, it will suffice to state that the hydratable silicate starting material is fed through the input opening 12 and into the extruder barrel 14. In one embodiment contemplated herein, the silicate starting material is at least partially hydrated before being fed into the extruder barrel 14. Other embodiments to be described below contemplate the provision of the alkali metal silicate as a dispersion of solid particles in water in which case hydration will take place while passing through the extruder barrel 14. In yet another embodiment, the alkali metal silicate starting material can be provided in the form of a gel hydrate prepared from a liquid sodium silicate by gelation and partial dehydration.

As well known in the thermoplastics art, the extruder screws 16 is rotated to subject the input material to pressure, while the electrical heating coils 26 provide an input of heat energy to that material. It has been found that pressure in the range from about 20 p.s.i. to about 10,000 p.s.i., coupled with a heating of the mixture of alkali metal silicate and water, or the alkali metal silicate hydrate to a temperature in the range from about 100° C. to about 400° C. causes the hydration and/or physical conversion of that mixture to a fluid-like form having viscoelastic properties. These temperature and pressure ranges apply to operating parameters of extruders commercially available, with 400° C. being close to the maximum temperature under which water can be held by pressure in a liquid form. The water is provided to act as a foaming agent, irrespective of its precise physical form. The exact temperature and pressure conditions at which the extruder device 10 is intended to operate will have to be varied, as well be seen from the typical examples below. It will be evident, however, that the operating temperature and pressure in the extruder device 10 will normally be chosen to provide a temperature causing vapourization of all, or nearly all of the water in the extrudate being discharged while the related operating pressure of the extruder inhibits steam formation from the hydrated silicate within the extruder device 10. As the silicate material containing water of hydration under pressure is discharged to atmosphere through the extrusion orifice, the water of hydration that had previously been under pressure, can now expand and cause the silicate to foam. Thus, water of hydration acts as the foaming agent and as long as there is about 5% by weight of water, foaming will occur.

It is also to be noted that the shearing action of the extruder screw is advantageous for intimately and uniformly mixing the alkali metal silicate starting material with a complexing or insolubilizing agent in those instances when such starting material is to be insolubilized. This intimate and uniform mixing in those embodiments becomes an inherent part of the step of converting the input material into an insolubilized material having viscoelastic properties.

The extruder screw 16 can provide sufficient mixing of the alkali metal silicate starting material and a selected inorganic or organo metallic complexing or insolubilizing additive that pre-mixing of the various ingredients can be reduced and possibly eliminated entirely. It will also be evident that some mixing will occur in the feed hopper or other similar apparatus (not shown) that is normally coupled to the inlet opening 12. The extent of that mixing can, however, be rather limited. Mixing of the ingredients in the extruder is also accompanied by conversion of mechanical energy into heat by virtue of the shearing action of the extruder screw 16.

U.S. Pat. 3,663,249 of May 16, 1972 to Ramesh P. Rao describes the production of insoluble silicate foams by foaming a dry intermediate of hydrated silicate and complexing agent which has been prepared by mixing particulate alkali metal or alkaline earth metal silicate and the complexing agent, and treating that mixture with saturated steam at the hydration temperature of the silicate, thereby achieving uniform distribution and penetration of the reactants. The silicate starting material can be in the form of a powder which is dry, or pelletized; or it can be an aqueous solution of alkali silicate having a high silica to alkali ratio, preferably, from 3:1 to 5:1, known in the art as "waterglass." An insolubilizing agent used in any given instance with the alkali metal silicate starting material, can cause various gases to be produced in the extruder device 10 when physical conversion of the mixture takes place. Thus, the extruder device 10 can be a vented machine, if desired, to expel these gases which normally are not wanted. Alternatively, the vent opening on such a vented machine can also be used to introduce more gas, such as steam, if required. Any gases entrapped within the cells of the extruded foamed alkali metal silicate will affect some of the properties of the foamed product so produced. In particular, thermal conductivity is affected by such entrapped gases, and to a lesser extent, density is also affected. Foamed silicate products made in accordance with this invention have a density in the range from approximately five pounds per cubic foot to about thirty pounds per cubic foot. Preferably, however, the density of the foamed silicate product will be in the range from about five to approximately ten pounds per cubic foot. Finally, it is noted that the physical and chemical properties of the foamed product will vary with composition, density, cell size and with cell wall orientation.

Modifications to the basic extruder device illustrated in FIG. 1 have been utilized in a number of exploratory trial runs that have been carried out. The apparatus illustrated in FIG. 2 shows one such arrangement that has been used, and which will be described below. The process contemplated herein is preferably a continuous process which can be carried out using apparatus of the type illustrated schematically in FIG. 6. A further modification of the basic apparatus of FIG. 1 which can be used in carrying out uninterruptedly the process contemplated herein is shown in FIG. 7. There, a continuous extrusion system is shown wherein a slurry (a dispersion of particles in water) introduced into the barrel of the extruder is hydrated before entering the extruder.

EXAMPLES

Figure 4A:
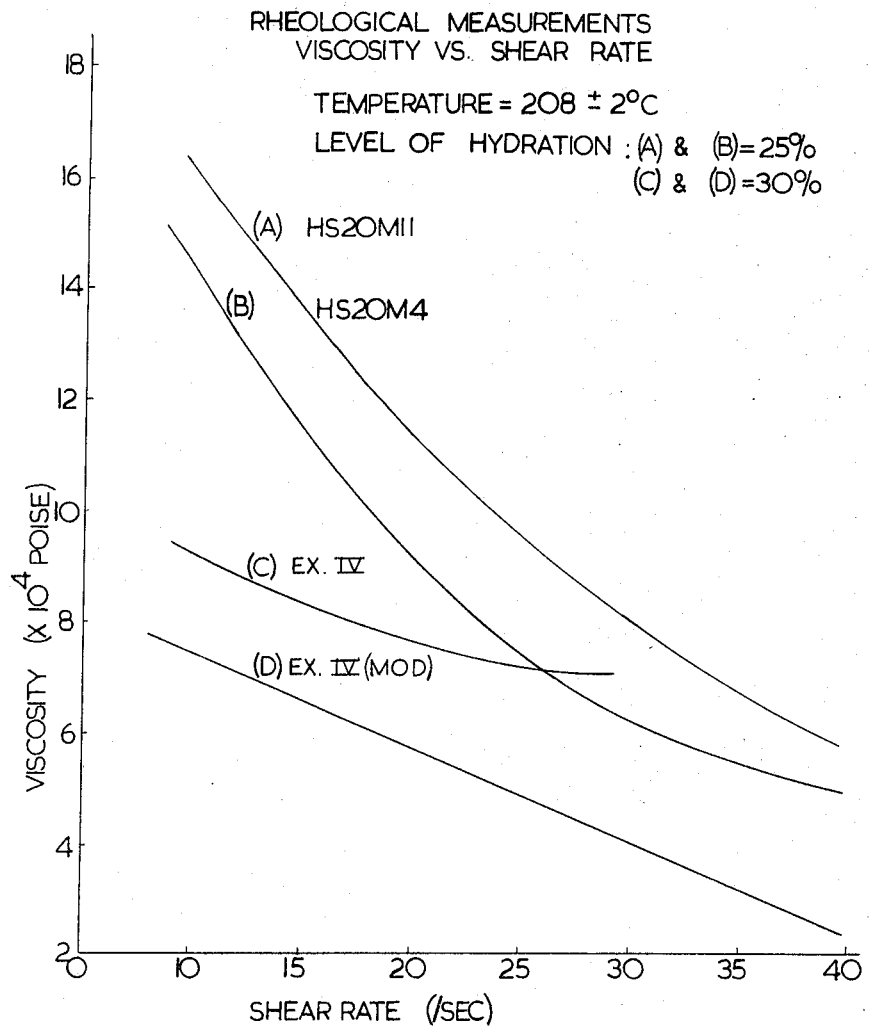

In connection with conducting various extrusion experiments using the apparatus shown in FIG. 2, rheology measurements were carried out to compare the relative flow properties of selected hydratable silicate starting materials; and to define suitable operating parameters. FIGS. 4 and 4A show the viscosity of typical preferred starting compositions designated as "F56M11" and "F56M11 modified" in FIG. 4; and a particulate sodium silicate originally designated 1Na$_2$O:5SiO$_2$, shown in FIG. 4A and having the composition set out in Column 7. FIG. 4A also shows viscosity characteristics of two compositions designated HS20M11 and HS20M4, made up as set forth in Column 7.

The viscosity is measured as a function of the shear rate to which the typical compositions will be subjected in the extrusion device (FIG. 2), at a selected temperature of 210° C. FIG. 4 further shows similar values measured on a hydratable glass 18F, whose composition is as follows:

| EX. I—18SF | Percent by weight |
|---|---|
| $SiO_2$ | 67.8 |
| $Na_2O$ | 21.9 |
| $B_2O_3$ | 3.6 |
| $Al_2O_3$ | 5.2 |
| $TiO_2$ | 1.0 |
| MgO | 0.2 |
| $Fe_2O$ | 0.4 |
| | 99.9 |

FIGS. 4 and 4A serve to illustrate on the basis of some measured values the degree of fluidity achievable in viscoelastic hydrated silicate starting materials, as well as some effects upon the rheology by the silicate hydrate composition. This rheological data will indicate to those knowledgeable in extruder operations the feasibility of extruding a selected one of a multitude of insoluble silicate compositions. This data will also segregate the preferred compositions from others of those chosen for consideration. Excessively high viscosity, for instance, will be deterrent.

Apparatus such as that described in FIG. 2 was used to conduct a number of exploratory extrusion experiments of limited duration. A pressurized feed hopper 200 was charged with selected silicate compositions known from the Rao patent mentioned above, to yield foams of desirable chemical and physical properties, the compositions being dispersed in water varying from about 30% to about 40% by weight of the total dispersion. The exploratory extrusion experiments served to optimize temperature and pressure conditions under which the foamable silicate composition would be extruded. The formulation for example, of F56M11 starting material which was used in runs ES1 and ES2 of Table 1, in FIG. 3, was as follows:

| Example II | Parts by weight | Weight percent of formulation |
|---|---|---|
| SS 65 [1] (anhydrous) | 3,889 | 47.6 |
| Al(OH)$_3$·XH$_2$O (69% Al$_2$O$_3$) | 338 | ca. 4.2 |
| Boric acid (H$_3$BO$_3$) | 338 | ca. 4.2 |
| CTB$_2$ (calciumtetraborate—CaB$_4$O$_7$) | 58.5 | ca. 0.7 |
| FN500 [2] | 117 | ca. 1.4 |
| "O"-silicate [3] | 500 | ca. 6.2 |
| H$_2$O | 2,914 | ca. 37.7 |
| Total | 8,154.5 | 100.0 |

[1] A trade designation of Philadelphia Quartz, for a fine particulate anhydrous material having a ratio of Na$_2$O to SiO$_2$ of 1:3.22, and a mesh size of 65 American Standard.
[2] FN500—a trade designation for polyethylene powder.
[3] "O"-Silicate—a trade name of Philadelphia Quartz, a solution of sodium silicate in the ratio of 1 Na$_2$O to 3.22 of SiO$_2$, containing about 38.7% solids and the balance water.

Subsequent extrusion runs were carried out using a modified formulation of F56M11, about as follows, with the water in the hydrate being varied from about 30 to 35 weight percent. These subsequent extrusion runs are tabulated in FIG. 3, as ES3 to ES12. The F56M11 modified formulation used, was:

| Example III | Parts by weight | Weight percent of formulation |
|---|---|---|
| SS 65 (anhydrous) | 4,458 | 58.6 |
| Al(OH)$_3$ | 364 | 4.8 |
| Boric acid | 364 | 4.8 |
| Bentonite clay | 20 | 0.3 |
| "O"-silicate | 300 | 3.9 |
| H$_2$O | 2,104 | 27.6 |
| Total | 7,610.0 | 100.0 |

Both of the foregoing formulations were targeted to yield an insolubilized silicate foam of a composition approximating SiO$_2$—69.7% by weight; Na$_2$O—20.84% by weight; Al$_2$O$_3$—5.04% by weight; B$_2$O$_3$—3.89% by weight and CaO—0.52% by weight.

The insolubilized compositions whose rheology data is shown in FIG. 4A are as follows:

| | Parts by weight | |
|---|---|---|
| | Example IV | Example IV (Mod.) |
| Na$_2$O | 18.17 | 18.00 |
| SiO$_2$ | 79.33 | 78.50 |
| Al$_2$O$_3$ | 2.51 | 2.50 |
| NH$_3$ | 0.00 | 1.00 |
| Total | 100.01 | 100.00 |

The amount of ammonia additive corresponds to 20% of the molar level of Na$^+$ ions. It is to be noted that the above compositions (IV and IV (Mod)) reflect a mole ratio of 1 Na$_2$O to 4.5 SiO$_2$.

| | Parts by weight | |
|---|---|---|
| | Example V | Example V (Mod.) |
| Sodium silicate SS 65 | 69.10 | 69.10 |
| Aluminum hydrate RH-73 | 7.51 | 7.51 |
| Boric acid H$_3$BO$_4$ | 4.01 | 4.01 |
| Ammonium phosphate (NH$_4$)$_2$HPO$_4$ | {Nil / Nil} | {2.53 / 0.77} |
| Ammonia (29% sol.) | 2.21 | Nil |
| Phosphoric acid (85%) | 20.80 | 20.67 |

Examples V and V (Mod) were derived from a silicate with a 1:3.22 ratio as in Examples II and III. All of these compositions I to V exhibit viscosity in the range up to 16×10$^4$ poises, and most do not exceed 12×10$^4$ poises at the temperature and level of hydration indicated.

To conduct the various extrusion runs, the pressurized feed hopper 200 was connected by means of suitable conduits shown generally at 202, to the input end of the barrel of a conventional extruder device 204, known as a "Brabender extruder." The extruder 204 was adapted to have a screw, in this instance a metering screw, inserted into a 0.75 inch diameter by 19.5 inches long extruder barrel and rotatably driven from a variable speed, electrically driven DC motor 206. In the embodiment of FIG. 2, the metering screw functions to feed material being processed through the extruder 204. The screw can also provide uniform and intimate mixing of the alkali metal silicate and any insolubilizing additives included therein. The pressure which coacts with the heat and mechanical energy to physically convert the hydratable silicate material to a viscoelastic condition is derived from the steam pressure developed by heat input, and by the screw. An inert gas is used to pressurize the feed hopper 200, preventing backward flow of the steam from the extruder barrel.

The discharge end of the extruder 204 was fixedly secured to a tubing die 208. The extruder screw was inserted into the barrel of the extruder 204, and the feed stock was mixed. A plug made conveniently from polystyrene was initially provided in the discharge orifice of the tubing die 208, to allow pressurizing the system and the die secured to the extruder 204. The hopper 200 was then charged with the slurry, sealed, and the system pressurized to 150 p.s.i.g. A feed valve shown conveniently at 210 was opened to allow the slurry to be fed into the barrel of the extruder 204. The temperature in three zones along the barrel of the extruder 204 was controllably heated or cooled using heating and cooling means (not specifically shown) as was the die zone. This is indicated in columns 3–5, while columns 6 and 7, respectively, show the temperature of the die and of the material in the barrel.

Motor 206 was operated to slowly rotate the extruder screw, and the temperature varied within the barrel of the extruder 204 as well as the speed of operation of the motor 206 which, in turn, governs the rotational speed of the screw. In the embodiment of FIG. 2, gaseous nitrogen was introduced into the pressurized feed hopper 200 by valve and conduit means 212, and the nitrogen was used to provide a back pressure for the entire system. It will be evident that pressure regulating means are associated with a supply of pressurized gas and the valve and conduit means 212 to provide the pressure desired for the hopper 200 in any given instance. Again, the operating temperature of the extruder 204 was chosen to ensure that upon discharge of the hydrated silicate through tubing die 208, the water of hydration would be converted to steam, i.e., expand, and cause foaming of the extrudate. The operating pressure used was such as to prevent steam formation in the extruder barrel. The silicate material being extruded had a dwell or residence time in the extruder sufficient to hydrate, plasticize, react and completely homogenize the silicate material. Residence time is not a critical parameter, since it will vary with the composition, the rate of heat input, screw speed, barrel dimensions and so on.

FIG. 3 clearly indicates the feasibility of extruding a sodium silicate hydrate starting material to produce a foamed product. In this particular embodiment the extruder 204 was used to hydrate the silicate starting material as well as form it to a desired shape. Using the system of FIG. 2 extrudate was continuously extruded, up to a period of four hours, in the form of a rod, or a tube, or a sheet. The density of the resulting sodium silicate foam was in the range of 10 to 18 pounds per cubic foot. Using higher temperatures and pressures in the entire system would foster a more complete and more rapid expansion of the water when the silicate hydrate is extruded, causing a corresponding lowering in the density of the resultant foam.

Such a lowering in the density of the extrudate could also be obtained using a tube furnace in line with the tubing die which would have the effect of causing greater expansion of the water of hydration (i.e., the foaming agent) to provide a density of the extruded foam in the range from approximately 6 to 10 pounds per cubic foot. More rapid expansion is also obtained this way.

As stated earlier it is preferable to use a silicate of sodium, potassium, rubidium or caesium, having a high silicate to alkali oxide ratio, preferably in the range from about 1:1 to 5:1. Silicate materials having a ratio of up to 6 or 7:1 have been produced by suppliers and are obtainable. In instances where the starting material is in the form of a powder, the powder will preferably be of a mesh size from about 10 to 300 U.S. standard. In order to insolubilize the silicate starting material, a selected complexing or insolubilizing agent was added to form a mixture, the insolubilizing agent being one or more of the following: boric acid, hydrated alumina (0.8 micron particles) and magnesium metal powder. For a more complete listing of a specific formulation of different starting materials, insolubilizing agents and various physical properties of the foamed silicate, per se, the reader is referred to U.S. Pat. No. 3,743,601 of Ramesh P. Rao, of July 3, 1973; which is directed to the preparation of silicate foam compositions from particulate alkali metal silicates. The preparation of such compositions does not form part of the present invention. Also as mentioned earlier, the mixture can be hydrated using any one of a number of well known hydration processes in order to provide a water content in the extruder in the range from about 5% to about 40 weight percent of water, preferably from about 25% to about 35% by weight. This water acts as the foaming agent.

Figure 6:
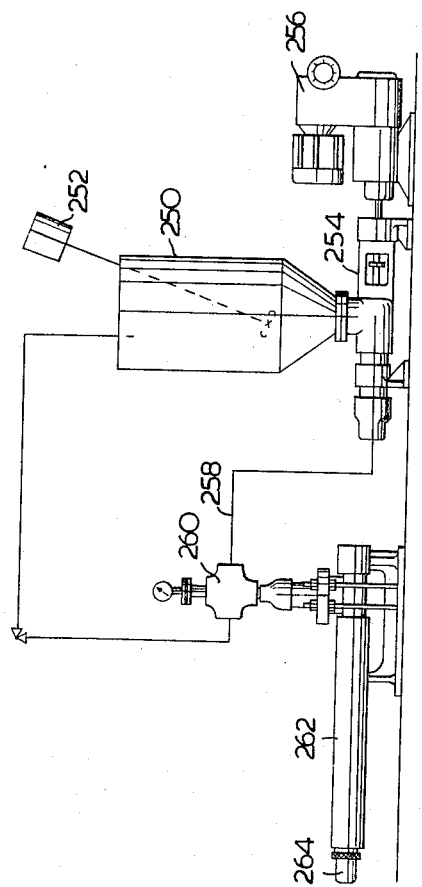
FIG. 6 shows schematically a preferred embodiment for carrying out the process described herein.
Figure 7:
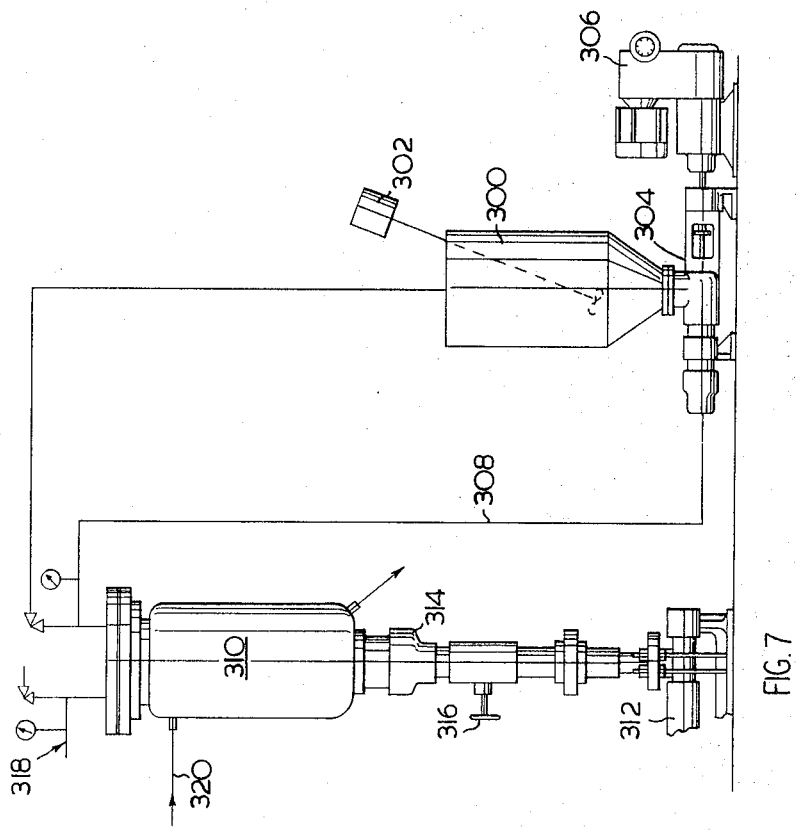
FIG. 7 also shows schematically a further preferred embodiment for carrying out the process contemplated herein.

FIG. 6 shows a modified arrangment of a system used to perform continuously or uninterruptedly the process described above in connection with the apparatus of FIG. 2. The arrangement of FIG. 6 differs to the extent that a reservoir 250 is provided to mix a dispersion of particulate silicates in water or aqueous solutions continuously therein by means of a mixing device 252. The reservoir 250 is adapted to be connected to pump means 254 that can be driven in any convenient manner by a power source 256 which could be an electric motor, an internal combustion engine, or the like. The reservoir 250 and pump means 254 were connected through suitable conduits 258 and a pressure regulating head 260 to the input opening of a conventional screw-type extruder 262. The extruder 262 that was used is known as a "Brabender" extruder whose construction and mode of operation is well known in itself, and therefore need not be described here. The extruder 262 had a tubing die 264 secured to the discharge orifice of the extruder. By means of this arrangement it is possible to have a continuous, uniform feed of silicate starting material delivered by pump means 254 to the extruder 262. This arrangement is advantageous since it allows higher speeds of rotation of the extruder screw to be used, since the feed of the dispersion to the extruder screw will be both controllably uniform and positive. It is also noted that using a reservoir 250 with a mixing device 252 will provide the capability of altering the formulation of the silicate starting material while running.

The arrangement of FIG. 6 enables studies to be conducted on the subject of internal energy foaming, i.e., whether there is enough sensible heat present in the extruded hydrate to facilitate near complete foaming. Relationships between mechanical work input and mixing efficiency of the screw will also be more apparent. FIG. 5 of the accompanying drawings shows the theoretical output rate from a 0.375 inch O.D., 0.250 inch I.D. diameter annulus with speeds of rotation of the screw. Two experimental points are shown by "X" and demonstrate how a computer programme taking into consideration theoretical data for a given extruder screw, can simulate an extrusion run.

A further modification to the apparatus of FIG. 2 can be seen in the schematic view of FIG. 7. This drawing depicts a continuously operable extrusion system whereby the dispersion is prehydrated before entering the extruder. Such prehydration is useful if the retention time in the extruder is too short to allow complete hydration and/or reaction to take place. As in the arrangement of FIG. 6, FIG. 7 shows a reservoir tank 300 having a mixing device 302 mounted therein. The reservoir tank 300 is mounted in communication with a pump means 304 that is adapted to be run by a power source 306 which is preferably in the form of an electrically driven motor of variable speed. Conduit means 308 are connected to the discharge side of the pump means 304 for conducting the dispersion which has been mixed in the reservoir tank 300 into a pressurizable feed hopper 310. The feed hopper 310 is itself adapted to be connected to the input end of the barrel of an extruder 312. This extruder 312 can be a "Brabender" extruder whose construction and method of operation are well known per se, as mentioned previously. The feed hopper 310 has output conduit means shown overall at 314 connected thereto for discharging the hydrated silicate from the hopper into the extruder 312. Valve means 316 are provided in the conduit means 314 to control the output from the hopper 310 into the barrel of the extruder 312. It will also be seen from FIG. 7, that the hopper 310 is sealed and adapted to be pressurized by means of an inert gas such as nitrogen, introduced by input conduit means 318. A steam conduit 320 is also in flow communication with the interior of the feed hopper 310, allowing steam to be injected into the hopper and cause hydration of the silicate before the latter is fed into the extruder 312.

It is to be emphasized that the specific formulations mentioned above are merely representative of a much wider range of silicate compositions which are hydratable, therefore exhibiting viscoelastic properties, and which can be foamed with the water of hydration as the foaming agent.

For additional examples of other specific hydratable silicate compositions which satisfy the foregoing requirements, the reader is referred to our U.S. Pat. 3,743,601 of R. P. Rao mentioned earlier.

The foregoing description has referred to a number of embodiments for carrying out the present invention, and has described certain modifications. It is comprehended within the spirit of this invention to include all such modifications and alternatives as will be obvious to those skilled in this art and coming within the scope of the appended claims.

I claim:

1. In a process for producing foamed products from a foamable hydratable alkali metal silicate starting material; the improvement comprising:
   physically converting the alkali metal silicate starting material to a fluid-like viscoelastic condition containing water of hydration under pressure by exposure in an extrusion device to a temperature in the range from about 100° C. to about 400° C. and a pressure of less than about 10,000 psi sufficient to inhibit vapour formation at the selected operating temperature, the extrusion device causing mixing of the starting material under progressively increasing shear, temperature and pressure whereby said fluid-like viscoelastic condition is attained, maintaining these temperature and pressure conditions in said extrusion device until the silicate mass is hydrated, plasticized, reacted and completely homogenized; and then extruding the silicate mass through a die, whereby the water of hydration previously under pressure is converted to steam and causes foaming.

2. The process of Claim 1, wherein the temperature is in the range from about 120° C. to about 250° C. with a related pressure sufficient to inhibit vapour formation at the temperature selected.

3. The process of Claim 1, wherein the hydrated alkali metal silicate is stabilized by chemically reacting an insolubilizing additive with the alkali metal silicate whereby the water soluble alkali metal silicate is converted into a sparingly water soluble silicate.

4. A continuous process for producing foamed products comprising the steps of:
preparing an alkali metal silicate for hydration;
adding an insolubilizing material to the alkali metal silicate;
exposing the alkali metal silicate and insolubilizing material in an extruder to a temperature in the range from about 100° C. to about 400° C. and a pressure in the range from about 20 p.s.i. to about 10,000 p.s.i. sufficient to inhibit vapour formation at the temperature selected, in the presence of water to chemically react and hydrate said insolubilizing material and alkali metal silicate, the extruder causing mixing of the alkali metal silicate and insolubilizing material under progressively increasing shear, temperature and pressure, physically to convert the hydrated insolubilized silicate in the extruder to a fluid-like viscoelastic condition containing water of hydration under pressure;
then extruding the hydrated silicate through a die, whereby the water of hydration under pressure which has now been released, is converted to steam and causes foaming; and
confining the extruded silicate during foaming to effect shaped foaming of the same.

5. The process of Claim 4, wherein the insolubilizing additives are mixed and reacted with the alkali metal silicate before hydration.

6. The process of Claim 4, wherein the insolubilizing additives are mixed and reacted with the alkali metal silicate after hydration.

7. A process for extruding foamable products made of a silicate, comprising the steps of:
preparing a hydrated alkali metal silicate;
stabilizing the hydrated alkali metal silicate by chemically reacting at least one selected insolubilizing material therewith to render said silicate sparingly water soluble;
physically converting the stabilized, hydrated silicate in an extruder to a fluid-like viscoelastic condition containing water of hydration under pressure by exposure in said extruder to a temperature in the range from about 120° C. to about 250° C. and a pressure in the range from about 200 p.s.i. to 5,000 p.s.i. said pressure inhibiting vapour formation in said extruder, the extruder causing mixing of the alkali metal silicate and insolubilizing material under progressively increasing shear, temperature and pressure, and
reducing the pressure rapidly by extruding the silicate through a die to enable the water of hydration previously under pressure and elevated temperature to be converted to steam causing foaming of the silicate extrudate.

8. A process for manufacturing foamed products for the construction industry, appliance or automotive industry or the like, comprising the steps of:
first chemically reacting at least one selected insolubilizing material with an alkali metal silicate to render said silicate sparingly water soluble; and
exposing the insolubilizing material and alkali metal silicate in an extruder to a temperature in the range from about 120° C. to about 250° C. and a pressure in the range from about 20 p.s.i. to about 10,000 p.s.i. which inhibits vapour formation in the extruder in the presence of water, the extruder causing mixing of the alkali metal silicate and insolubilizing material under progressively increasing shear temperature and pressure, to chemically react and hydrate said insolubilizing material and alkali metal silicate, and physically convert the hydrated insolubilized, silicate in said extruder to a fluid-like viscoelastic condition containing water of hydration under pressure; and then
reducing the pressure very rapidly by passing the converted silicate mixture through a die to enable the water of hydration previously under pressure to be converted to steam causing foaming of the extrudate to a predetermined cross-sectional shape.

9. The process of Claim 8, wherein the alkali metal silicate is a particulate sodium silicate.

10. The process of Claim 8, wherein the alkali metal silicate is a powdered sodium silicate.

11. The process of Claim 1, wherein the formable hydratable alkali metal silicate starting material yields a viscosity at the operating temperature and pressure conditions which is in the range from about $4 \times 10^4$ poises to about $16 \times 10^4$ poises.

12. The process of Claim 1, wherein the hydratable silicate starting material is a hydratable insolubilized glass in powder form having the composition in the following proportions by weight:

| | Percent |
|---|---|
| $SiO_2$ | 67.8 |
| $Na_2O$ | 21.9 |
| $B_2O_3$ | 3.6 |
| $Al_2O_3$ | 5.2 |
| $TiO_2$ | 1.0 |
| $MgO$ | 0.2 |
| $Fe_2O$ | 0.4 | and is dispersed in water such that the water content amounts to about 30% to about 40% by weight of the total dispersion.

References Cited
UNITED STATES PATENTS

| 3,743,601 | 7/1973 | Rao | 252—62 |
| 2,264,246 | 11/1941 | Lytle | 65—22 |
| 2,041,222 | 5/1936 | Bates | 65—127 |
| 3,663,249 | 5/1972 | Rao | 106—75 |
| 2,255,237 | 9/1941 | Willis | 65—22 |
| 2,322,581 | 6/1943 | Lytle | 65—22 |
| 3,268,350 | 8/1966 | Grebe | 106—75 |

M. J. WELSH, Primary Examiner

G. R. MARSHALL, Assistant Examiner

U.S. Cl. X.R.

106—40 R, 75; 425—378, 817